(12) United States Patent
Collado et al.

(10) Patent No.: US 11,603,123 B1
(45) Date of Patent: Mar. 14, 2023

(54) COLLAPSIBLE SHOPPING CART

(71) Applicants: Dario A. Collado, Lindenhurst, NY (US); Arelis Olivieri Collado, Lindenhurst, NY (US)

(72) Inventors: Dario A. Collado, Lindenhurst, NY (US); Arelis Olivieri Collado, Lindenhurst, NY (US)

( * ) Notice: Subject to any disclaimer, the term of this patent is extended or adjusted under 35 U.S.C. 154(b) by 0 days.

(21) Appl. No.: 17/543,961

(22) Filed: Dec. 7, 2021

Related U.S. Application Data

(60) Provisional application No. 63/123,128, filed on Dec. 9, 2020.

(51) Int. Cl.
*B62B 3/02* (2006.01)
*B62B 5/06* (2006.01)
*B62B 3/14* (2006.01)

(52) U.S. Cl.
CPC ............ *B62B 3/027* (2013.01); *B62B 3/1476* (2013.01); *B62B 3/1492* (2013.01); *B62B 5/06* (2013.01)

(58) Field of Classification Search
CPC ..... B62B 3/027; B62B 3/1476; B62B 3/1492; B62B 5/06; B62B 5/0003; B62B 2205/20; B62B 2205/06; B62B 3/022
See application file for complete search history.

(56) References Cited

U.S. PATENT DOCUMENTS

| | | | |
|---|---|---|---|
| 2,414,943 A * | 1/1947 | Gray ...................... | A47D 9/005 280/DIG. 4 |
| 3,082,016 A * | 3/1963 | Pratt ..................... | B62B 5/0003 296/20 |
| 3,388,920 A | 6/1968 | Hill, Sr. et al. | |
| 3,752,527 A * | 8/1973 | Ferneau ................ | B62B 5/0003 280/5.32 |
| 4,192,541 A * | 3/1980 | Ferneau ............... | A61G 1/0256 280/640 |
| 4,199,170 A * | 4/1980 | Hubner ................. | B62B 5/0003 280/651 |
| 4,369,985 A * | 1/1983 | Bourgraf .................. | B62B 3/02 280/43.1 |
| 4,492,388 A * | 1/1985 | de Wit .................... | B62B 3/027 280/DIG. 4 |

(Continued)

FOREIGN PATENT DOCUMENTS

| | | | | |
|---|---|---|---|---|
| JP | 10086825 A | * | 4/1998 | ............... B62B 5/06 |
| WO | WO-2015188321 A1 | * | 12/2015 | ............... B62B 3/02 |

*Primary Examiner* — James A Shriver, II
*Assistant Examiner* — Ian Bryce Shelton
(74) *Attorney, Agent, or Firm* — Betsy Kingsbury Dowd, Esq.; BKDowd Law, P.C.

(57) ABSTRACT

A shopping cart for personal use includes a basket portion for collecting items, a platform supporting the basket portion, and a frame operatively attached to the platform configured to position the cart in an in-use position and in a collapsed position for transport and storage. The frame includes foldable bars constructed with upper and lower bars lockably hinged via a lockably hinged connector, to convert the shopping cart from in-us to the collapsed position. A handle bar is connected across the upper bars, wherein upward pulling on the handle unlocks the cart from the in-use position, allowing the upper and lower bars to hingedly collapse parallel to one another. An upper set of wheels positioned on the platform contacts a ground surface only when the shopping cart is in a collapsed horizontal position.

20 Claims, 13 Drawing Sheets

(56) References Cited

U.S. PATENT DOCUMENTS

| | | | | |
|---|---|---|---|---|
| 6,070,899 | A * | 6/2000 | Gines | B62B 5/0003 |
| | | | | 280/655 |
| 7,494,149 | B2 * | 2/2009 | Liu | B62B 1/12 |
| | | | | 280/30 |
| 8,333,404 | B2 * | 12/2012 | Moster | B62B 3/027 |
| | | | | 280/38 |
| 8,408,581 | B1 * | 4/2013 | Hunter | B62B 3/027 |
| | | | | 280/33.993 |
| 9,126,610 | B1 | 9/2015 | Abiri | |
| 9,149,926 | B2 * | 10/2015 | Chen | F16M 11/38 |
| 10,081,381 | B2 * | 9/2018 | Lin | B62B 3/022 |
| 10,112,634 | B1 * | 10/2018 | Davydov | B62B 5/0003 |
| 10,407,088 | B1 * | 9/2019 | Le | B62B 5/065 |
| 2010/0123298 | A1 * | 5/2010 | Huang | B62B 7/083 |
| | | | | 280/647 |
| 2010/0229767 | A1 * | 9/2010 | Chiu | A47B 31/04 |
| | | | | 108/115 |
| 2012/0193894 | A1 * | 8/2012 | Fine | B62B 5/0003 |
| | | | | 280/651 |
| 2016/0200340 | A1 * | 7/2016 | Stankevitz | B62B 3/027 |
| | | | | 280/641 |
| 2016/0347341 | A1 * | 12/2016 | Tauber | B62B 5/0003 |
| 2017/0088154 | A1 * | 3/2017 | Lin | B62B 3/027 |
| 2018/0154916 | A1 * | 6/2018 | Yu | B62B 3/027 |
| 2020/0223465 | A1 * | 7/2020 | Geffen | B62B 3/027 |
| 2020/0346677 | A1 * | 11/2020 | Yu | B62B 3/025 |
| 2021/0061332 | A1 * | 3/2021 | Sturgeon | B62B 5/0461 |
| 2022/0032984 | A1 * | 2/2022 | O'Donnell | B62B 5/0003 |

\* cited by examiner

COLLAPSIBLE SHOPPING CART

CROSS-REFERENCE TO RELATED APPLICATIONS

This application claims the benefit of and priority to U.S. Provisional Application Ser. No. 63/123,128 entitled "COLLAPSIBLE SHOPPING CART," filed Dec. 9, 2020, the entirety of which is hereby incorporated herein by reference thereto.

FIELD OF DISCLOSURE

The present disclosure relates generally to shopping carts, in particular, to collapsible shopping carts.

BACKGROUND

Stationary carts for shoppers are conveniently supplied by stores. However, these carts are heavy, poorly sanitized and/or maintained. They provide additional costs to grocers including cost of labor to round up the carts and secure the carts, and losses from theft. Because the shopping carts are the property of the grocer, if the carts cause damage to automobiles and/or injure individuals, the grocer incurs liability. The carts also take up valuable marketable space for the grocer. Accordingly, there are advantages to encouraging shoppers to use their own personal shopping carts, which would alleviate these burdens on the grocers.

Although a few folding utility shopping carts do exist, they are designed with narrow and deep baskets, which results in groceries being piled on top of one another, causing spoilage and other damage to the items collected in the basket. Like conventional shopping carts, these personal shopping carts are often used with shopping bags to carry the groceries, primarily for ease in transporting the groceries from the cart into the car. In addition, when using personal, foldable shopping carts, the shopper must remove the groceries from the basket of the cart before the cart and basket can be collapsed for placing flat in the vehicle, whether placing it in a trunk of the vehicle or in the back of a minivan.

This continued reliance of most shoppers on plastic bags, even when a conventional folding-type of shopping cart is used, contributes to another problem related to current grocery shopping conventions: that is, environmental pollution caused by the disposal of billions of plastic products, including shopping bags. As is well known, government incentives to encourage shoppers to use fewer plastic bags have included charging the shopper between 5-25 cents per shopping bag. However, no strategic purpose has been designated for the fees collected, such as some type of environmental fund usage of that fee. Therefore, the fee simply remains as a fine to the shopper and as earned income to the grocer.

Furthermore, there is a need for personal shopping carts which are not shared with others and which can be easily collapsed and transported by the shopper. There is also a need to reduce the number of plastic bags used by shoppers. Currently, there is no known shopping cart that is foldable and transportable for personal use, and which can also be easily converted from a shopping cart with a basket for collecting groceries to a flat, folded position, for loading directly into a car or minivan, for example, without the need to first unpack the groceries collected in the basket. This means that shopping bags, likely plastic bags, would still be used by most shoppers, even those with a personal, collapsible, shopping cart.

Accordingly, there is a need for a collapsible shopping cart that is easy to adjust from a position for use as a shopping cart, to a position for storage and transport and with the contents collected in the shopping cart intact.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a collapsible shopping cart that is easy to adjust from a position for use as a shopping cart, to a position for storage and transport and with the contents collected in the shopping cart intact as described herein.

The present disclosure is also directed to collapsible shopping cart, which includes a basket portion for collecting items, and a platform configured to support the items collected in the basket portion, a central portion of the platform forming a bottom of the basket portion a frame. The platform also includes a front end portion and a rear end portion. The shopping cart also includes a frame operatively attached to the platform and configured to support and transport the basket portion. The frame is configured to position the shopping cart in an in-use position for shopping and in a collapsed position.

The shopping cart also includes two front wheels vertically disposed beneath the front end portion of the platform in the in-use position, each of the two front wheels positioned opposite one another along a first side portion and a second side portion of the shopping cart, and two rear wheels vertically disposed beneath the rear end portion of the platform in the in-use position. Each of the two rear wheels is likewise positioned opposite one another along the first side portion and the second side portion of the shopping cart, respectively. The two front wheels and the two rear wheels are operatively attached to a lower portion of the frame and configured to cooperatively contact a horizontal surface for transporting the shopping cart in the in-use position.

The shopping cart also includes two foldable bars. Each of the two foldable bars is positioned opposite one another along the first side portion and the second side portion, respectively. Each foldable bar also includes an upper bar and a lower bar, wherein a lockably hinged connector hingedly connects the upper bar to the lower bar.

The upper bar includes a pin slidably engaged with the lockably hinged connector in the in-use position. The upper bar and the lower bar are locked in alignment in a locked position via the lockably hinged connector to form a straight rigid bar in the in-use position.

The shopping cart further includes a handle bar connectedly extending upwardly from each of the upper bars. The handle bar connects the upper bar on the first side portion to the upper bar on the second side portion proximate the rear end portion of the platform, and is configured to be upwardly operable by a user to slidably disengage the pin from the lockably hinged connector on each of the first side portion and the second side portion for hinged rotation of the lower bar relative to the upper bar in an unlocked position.

In embodiments, each of the upper bars is rotatably connected to the platform along the rear end portion via a rear frame connector, each of the foldable bars in the locked position extending downwardly from the platform and forwardly along each of the first side portion and the second side portion of the shopping cart. Each of the upper bars is also rotatable upwardly and parallel to the platform via the rear frame connector, and each of the lower bars is hingedly rotatable rearward relative to each of the upper bars via the lockably hinged connector in the unlocked position. Via the rotatable connections with the frame connectors and lockably hinged connector, the lower bars may be rotated beneath and parallel to the upper bars in the collapsed position.

In additional embodiments, the shopping cart may further include two upper wheels connected to the front end portion of the platform.

The lower bars along each of the first side portion and the second side portion are operably connected, in further embodiments, across the lower portion of the frame via a stabilizer bar. The stabilizer bar may further be operably connected to and positioned forward of the two front wheels in the in-use position, the two front wheels being hingedly rotatable rearward and beneath the rear end portion. The two front wheels are positionable beneath the rear end portion, above the two rear wheels, and off of the horizontal surface in the collapsed position, so that the shopping cart may be horizontally transported via the upper wheels and the two rear wheels in the collapsed position.

In still further embodiments, the shopping cart may include two rigid bars, wherein each of the two rigid bars is positioned opposite one another along the first side portion and the second side portion respectively, each of the two rigid bars being rotatably connected to the platform along the front end portion via a front frame connector.

One of the two rigid bars in the in-use position, in embodiments, extends downwardly from the platform and rearwardly along the first side portion, adjacently crossing one of the two foldable bars positioned along the first side portion. The other rigid bar in the in-use position extends downwardly from the platform and rearwardly along the second side portion, adjacently crossing the foldable bar positioned along the second side portion of the shopping cart. Both of the two rigid bars are operatively connected to the two rear wheels.

In embodiments, the foldable bar and the rigid bar adjacently crossing each other along each of the first side portion and the second side portion are pivotably coupled via a coupling device.

In embodiments, the lockably hinged connector is located above the coupling device along each of the first side portion and the second side portion.

Each of the two rigid bars is preferably pivotable relative to the lower bar via the coupling device in the unlocked position and rearwardly rotatable via the front frame connector relative to the platform.

The two rigid bars are preferably positionable parallel to and beneath the platform in the collapsed position with the two rear wheels in contact with the horizontal surface.

In embodiments, the two rigid bars along each of the first side portion and the second side portion are operably connected across the lower portion of the frame via a foot bar, wherein the foot bar is operably connected to the two rear wheels.

The foot bar may be configured for anchoring the frame to the horizontal surface by a user stepping down on the foot bar to facilitate operation of the handle bar to lock and unlock the lockably hinged connector.

In embodiments, the stabilizer bar includes stabilizer feet, the lower bars being configured to rotate from the in-use position to a vertical position with the stabilizer feet contacting the horizontal surface, the front wheels and the rear wheels being position off the horizontal surface in the vertical position.

In embodiments, the shopping cart further includes at least two foldable extensions hingedly extending vertically upward from the platform to form two sides of the basket portion in the in-use position, each of the at least two foldable extensions being lockably and hingedly connected to the platform, the at least two foldable extensions configured to fold inward atop the platform in the collapsed position, and to lock in a vertical position in the in-use position.

Each of the at least two foldable extensions may include a metal frame that includes two legs extending upwardly from the platform in the in-use position.

Each of the at least two foldable extensions may further include a sheet of material connected between the legs.

The material in embodiments is plexiglass.

In embodiments, the at least two foldable extensions include a front foldable extension, a rear foldable extension, a left side extension, and a right side extension forming a front side, rear side, left side, and right side, respectively, of the basket portion in the in-use position, and wherein each of the front foldable extension and the rear foldable extension is hingedly connected via two hinge plates fixedly extending upward from the platform along each of the front end portion and the rear end portion of the platform, respectively, the two hinge plates extending along each of the first side portion and the second side portion of the shopping cart.

Each of the two legs of the front foldable extension and the rear foldable extension may include a locking pin extending outwardly from each of the first side portion and the second side portion of the shopping cart, in embodiments, wherein the locking pin is slidably captured and locked within a groove in each of the two hinge plates in the in-use position thereby locking each of the front foldable extension and the rear foldable extension in an upright vertical position.

In further embodiments, the groove includes a curved slot that curves downward toward the platform, and is configured to allow the locking pin to engage and rotate within the groove for inward hinged rotation of the front foldable extension and the rear foldable extension in the collapsed position flat against the platform, and wherein the groove further includes a straight portion vertically disposed along the leg, an upper end intersecting the curved slot, wherein the locking pin is captured in the curved slot in the in-use position, each of the front foldable extension and the rear foldable extension being configured for release from the upright vertical position by a user pulling upwardly to engage and rotate the locking pin in the curved slot.

Each of the two legs of the left foldable extension and the right foldable extension, in embodiments, includes a pin extending outwardly from each of the first side portion and the second side portion of the shopping cart, the shopping cart further including a locking bracket mounted onto each leg of each of the front and rear foldable extensions. The locking bracket is disposed vertically above the locking pin and includes a slot disposed with a downward-facing opening, wherein the pin is seated within the slot in the in-use position and is configured to dislodge from the slot in cooperation with the release of the front foldable extension and the rear foldable extension from the upright vertical position to allow inward rotation of the left foldable extension and the right foldable extension to the collapsed position flat against the platform.

The shopping cart may further include, in other embodiments, a fabric basket removably attachable to each of the at least two foldable extensions for collecting the items placed in the basket portion.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

Figure 1A:
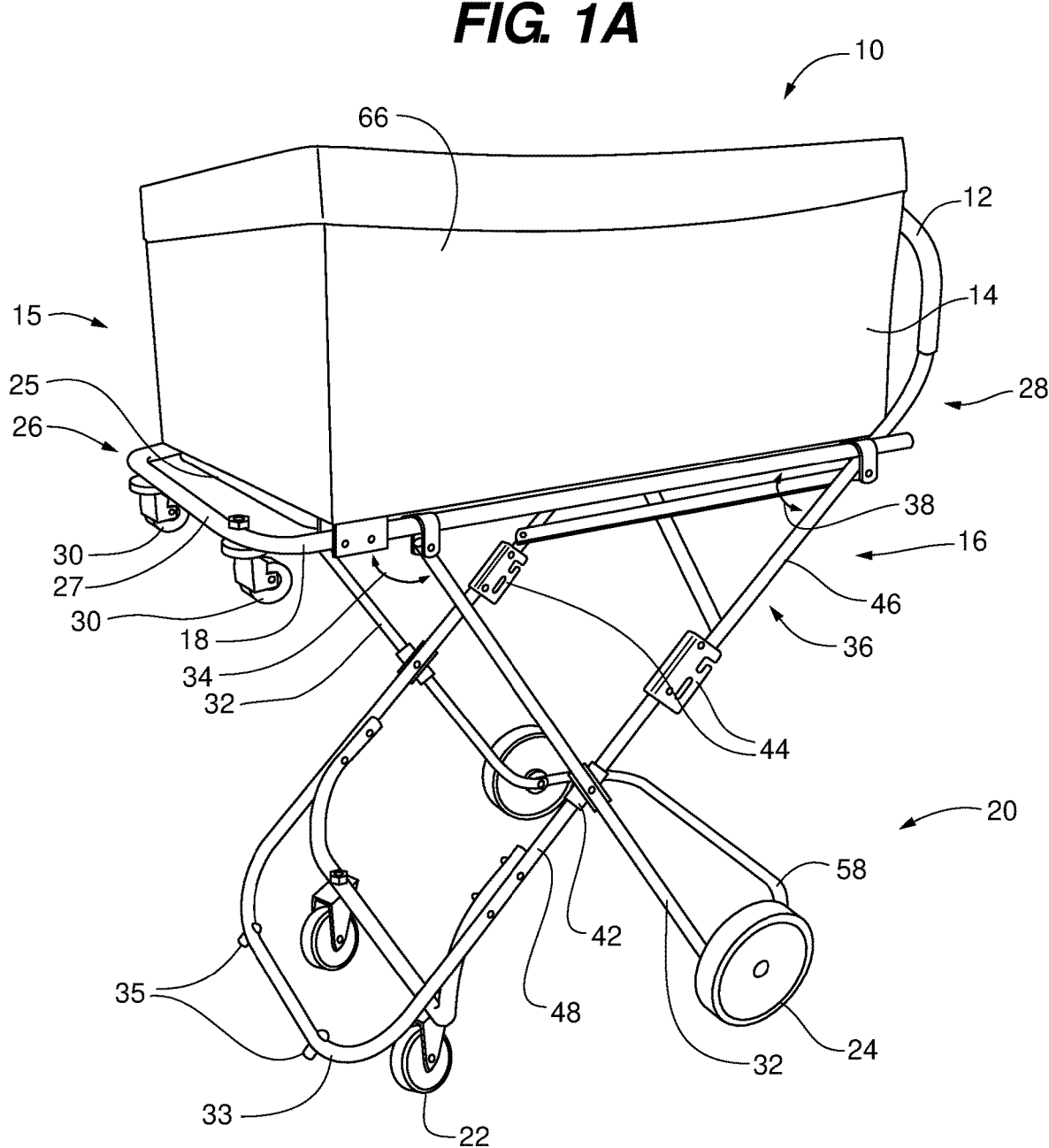
FIG. 1A is a pictorial representation of an embodiment of a shopping cart of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, it is contemplated that, additionally, there are items of the present disclosure that consist essentially of, or consist of, the one or more recited components or features.

As described below in reference to particular embodiments shown in the figures, the present disclosure is directed to a collapsible shopping cart that is easy to adjust from a position for use as a shopping cart, to a position for storage and transport, and is convertible from an in-use position to a horizontal, collapsed position for transport, with the contents collected in a basket portion intact.

Referring to FIGS. 1A—FIG. 1D, a shopping cart 10 of the present disclosure, also referred to herein as a personal shopping cart 10, includes a basket portion 14, and a frame 16 which includes a handle bar 12, and a platform 18 operatively attached to an upper portion 11 of the frame 16 for supporting the basket portion 14. The frame 16 also includes a lower portion 20 that is operatively connected to one or more front wheels 22, in embodiments, a pair of front wheels 22, and to one or more rear wheels 24, in embodiments, a pair of rear wheels 24, which are aligned to together, or simultaneously, contact a horizontal surface, and allow the shopping cart 10 to be pushed and maneuvered by a user while collecting items in the basket portion 14. In the in-use position 15 shown in FIGS. 1A, 1B, and 1D for example, the platform 18 and the basket portion 14 are maintained in a horizontal position, with the platform 18 and basket portion 14 raised above the ground or other horizontal surface on which it may be transported.

In embodiments, the platform 18 includes a central portion 25, which in embodiments includes a mesh, preferably a metal mesh. The central portion 25 forms a bottom of the basket portion 14, i.e., is positioned within the basket portion 14, and bears the load of contents collected therein. A front end portion 26 of the platform 18 may include an extension 27 that extends from and forward of the central portion 25, i.e., beyond the basket portion 14, and substantially horizontal to the central portion 25. In embodiments, the upper portion 11 of the frame 16 may be connected to the platform 18 along the front end portion 26 and the rear end portion 28, as described further herein.

In embodiments, the front end portion 26, and in particular embodiments, the extension 27, of the platform 18 includes one or more upper wheels 30, which may be a pair of upper wheels 30. The upper wheels 30 allow the shopping cart 10 to be easily wheeled into a vehicle as it is collapsed for transport, as demonstrated, e.g., by FIGS. 2-5, with the basket portion 14 being maintained in a horizontal position with its contents intact as it is collapsed from the in-use position 15 to a horizontal collapsed position 62 (see FIG. 5).

Referring to FIGS. 1A-3A, the frame 16, in embodiments, may be connected to the platform 18 along the front end portion 26 at an upper end of each of two rigid bars 32, and along the rear end portion 28 of the frame 16 at an upper portion of the two foldable bars 36 that connects to the handle bar 12 and is parallel to the upper end of the two rigid bars 32. As shown, the handle bar 12 connectedly extends upward from the two foldable bars 36 and above the platform 18. In particular embodiments, the rigid bars 32 and the foldable bars 36 are rotatably connected to the platform 18 at the front end portion 26 and the rear end portion 28, respectively, in embodiments, via frame connectors 84 (see also FIGS. 9, 11). In embodiments, an opposing pair of apertures 88 (see FIG. 11) proximate a lower end of each frame connector 84 may be included, for example, for inserting a dowel pin therethrough, for a rotatable connection of the rigid bars 32 to the platform 18, as is shown, for example, in FIG. 3A.

Figure 1B:
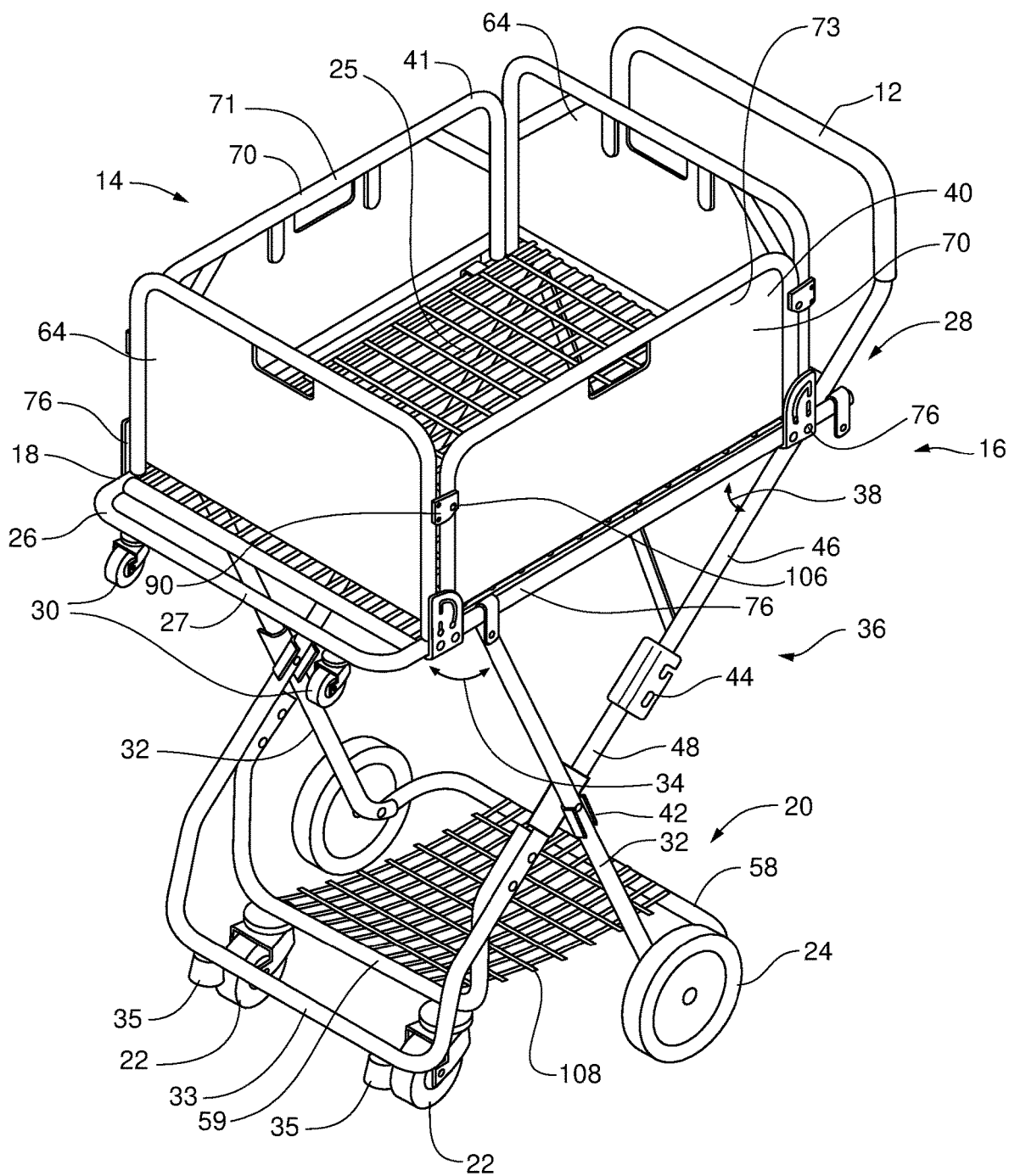
FIG. 1B is a pictorial representation of another embodiment of a shopping cart of the present disclosure.
Figure 2:
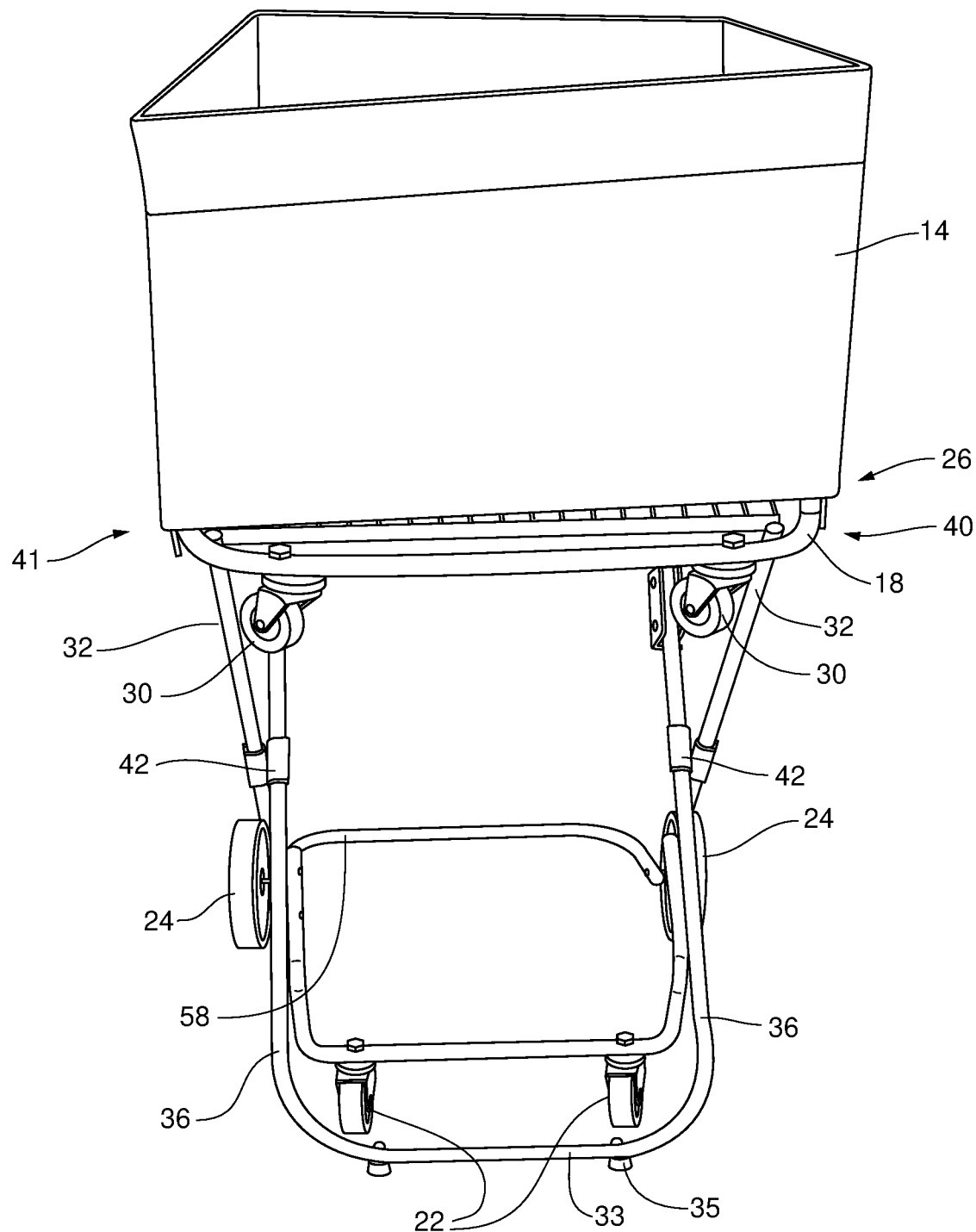
FIG. 2 is a pictorial representation of a front end of a shopping cart of the disclosure, with a foot bar engaged by a user for collapsing the shopping cart.

As shown in FIG. 2 for example, a first one of the rigid bars 32 and a first one of the foldable bars 36 are located along a first (left) side portion 40 of the shopping cart 10, and a second one of the rigid bars 32 and of the foldable bars 36 are located along a second (right) side portion 41 of the shopping cart 10. To evenly collapse the shopping cart 10, as further described herein, the two rigid bars 32 on each of the first side portion 40 and second side portion 41 are connected across the lower portion 20 of the frame 16 via a foot bar 58, which is also operably connected to rear wheels 24. The foldable bars 36 are also connected across the lower portion 20 of the frame 16 via a stabilizer bar 33, which is also operably connected to, and located in use forward of, the front wheels 22. In embodiments (see FIG. 1B), front wheels 22 on opposing side portions 40, 41 of the shopping cart 10 are connected via a front bar 59 positioned rearward of and parallel to the stabilizer bar 33, and the front bar 59 extends upward along, and is operatively connected to (e.g., bolted to), each foldable bar 36. In addition to the other features described herein, the foot bar 58 and the stabilizer bar 33 in cooperation with rigid bars 32 and foldable bars 36 allow for synchronizing the collapse of both sides of the shopping cart 10 to keep the platform 18 in a horizontal position during the transition.

Referring still to FIGS. 1A-3A, in embodiments, the foot bar 58 and rear pair of wheels 24 (which are vertically disposed below the rear end portion 28 of the platform 18) on the lower portion 20 of the frame 16 are also operatively connected via the rigid bars 32 to the front end portion 26 of the platform 18. Accordingly, each rigid bar 32 connects the front end portion of the platform 18 to the foot bar 58 and rear wheels 24, each rigid bar 32 extending downwardly from the platform 18 and rearwardly across each of the first side 40 and second side portion 41 of the shopping cart 10, at an obtuse angle 34 relative to the front of the platform 18 as shown in FIGS. 1A-1D.

In embodiments, as shown, the rear wheels 24 are of a larger diameter than the front wheels 22.

Still referring to FIGS. 1A-3A, each foldable bar 36 is operatively attached at an upper end to the rear end portion 28 of the platform 18 and at its other end to the stabilizer bar 33, which is forward of, and operatively attached to, the front wheels 22. Accordingly, each foldable bar 36 extends downwardly from the platform 18 and forwardly across each of the first side 40 and second side portion 41 of the shopping cart 10, i.e., at an acute angle 38 to a front of the platform 18, and of the frame 16, so that the foldable bar 36 and rigid bar 32 along the first side portion 40 adjacently cross each other, and the foldable bar 36 and rigid bar 32 along the second side portion 41 adjacently cross each other. Each foldable bar 36 along the first 40 and second side portion 41 is pivotably coupled via a coupling device 42 to the rigid bar 32 that is adjacently angled to it on the corresponding first 40 or second side portion 41 of the shopping cart 10.

Figure 12:
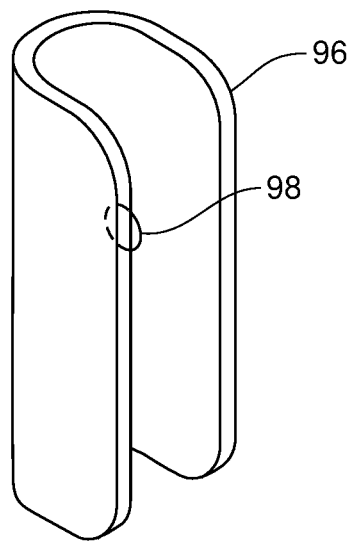
FIG. 12 is a pictorial representation of an embodiment of a bar grip connector.

Referring also to FIG. 12, the coupling device 42 may include a pair of connectors, for example a pair of bar grip connectors 96 as shown. Each bar grip connector 96 has a curved body open on one side and configured to fit around a portion of each of the rigid bar 32 and foldable bar 36 as shown. Each bar grip connector 96 also has a mounting aperture 98 for inserting a connecting pin, such as a dowel pin, or headed dowel pin. The connecting pin rotatably connects the pair of bar grip connectors adjacently mounted on each of the rigid bar 32 and foldable bar 36 on the first side portion 40, for example, and maintains a connection between the rigid bar 32 and foldable bar 36, while allowing rotation from a crossed position of the rigid bar 32 relative to the foldable bar 36 when the shopping cart 10 is in use, to a parallel position when the shopping cart 10 is in the horizontal position shown in FIGS. 8A and 8B.

Figure 3A:
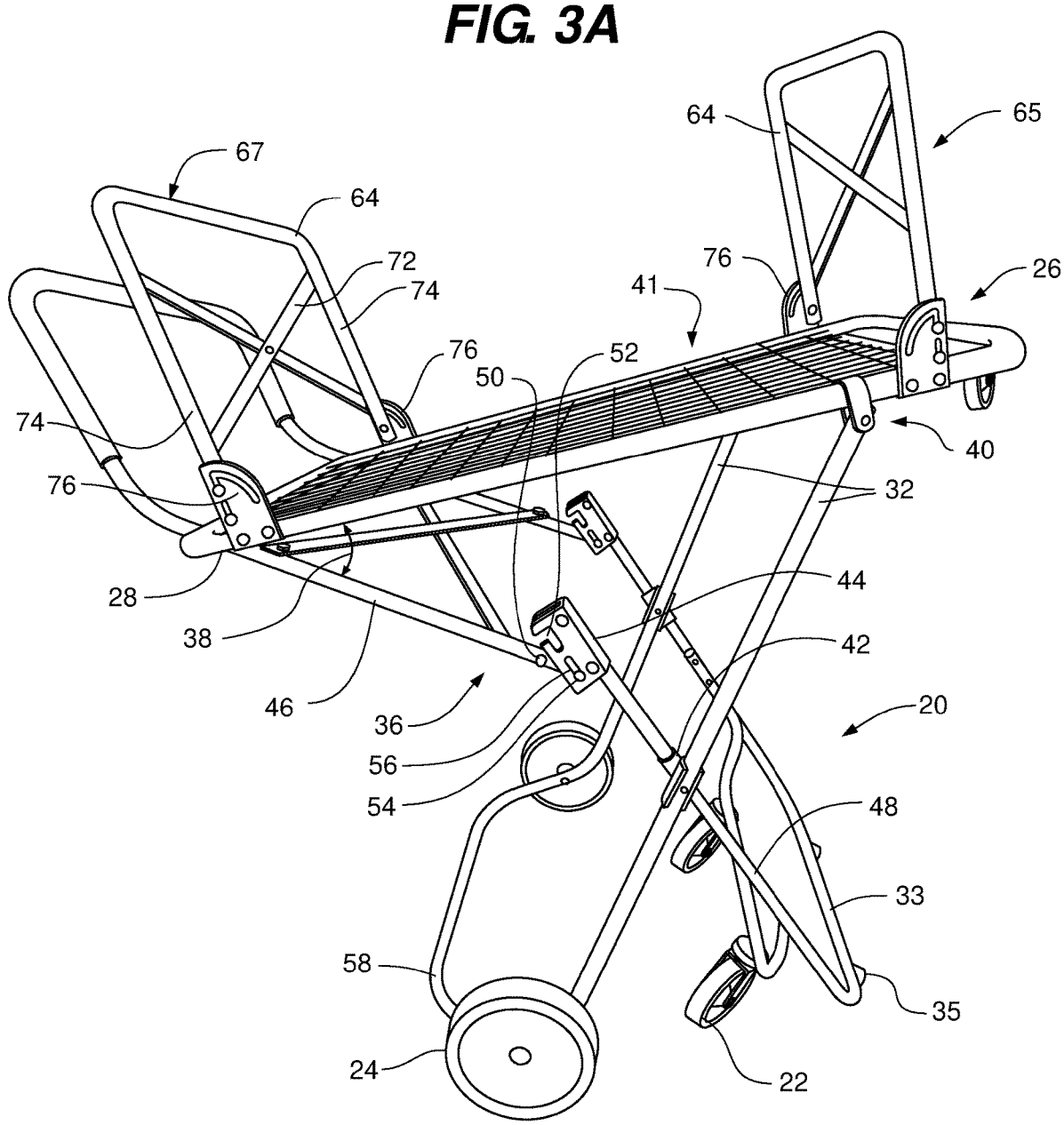
FIG. 3A is a pictorial representation of an embodiment of the shopping cart of the present disclosure in a partially collapsed position.
Figure 3B:
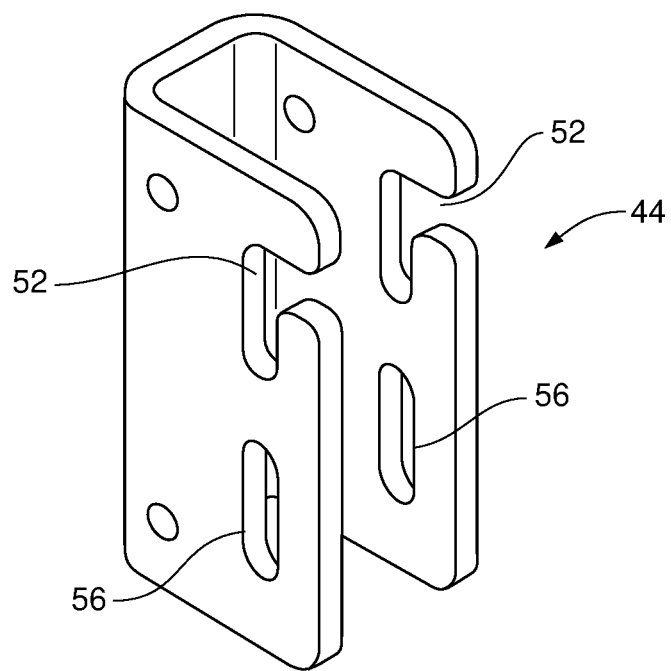
FIG. 3B is an embodiment of a lockably hinged connector positioned on collapsible bars and configured to collapse a shopping cart of the present disclosure.

Referring also to FIG. 3B, each foldable bar 36 on each of the first 40 and second side portion 41 includes a lockably hinged connector 44 which allows the foldable bar 36 to be locked into the locked, in-use position 15 for shopping as shown in FIG. 1A and FIG. 1B, wherein the upper bar 46 and the lower bar 48 are locked in alignment so that each foldable bar 36 forms one straight and rigid bar. In an unlocked position of the foldable bar 36, as described herein, the upper bar 46 and the lower bar 48 may be hingedly folded, as shown for example in FIG. 3A.

Figure 4A:
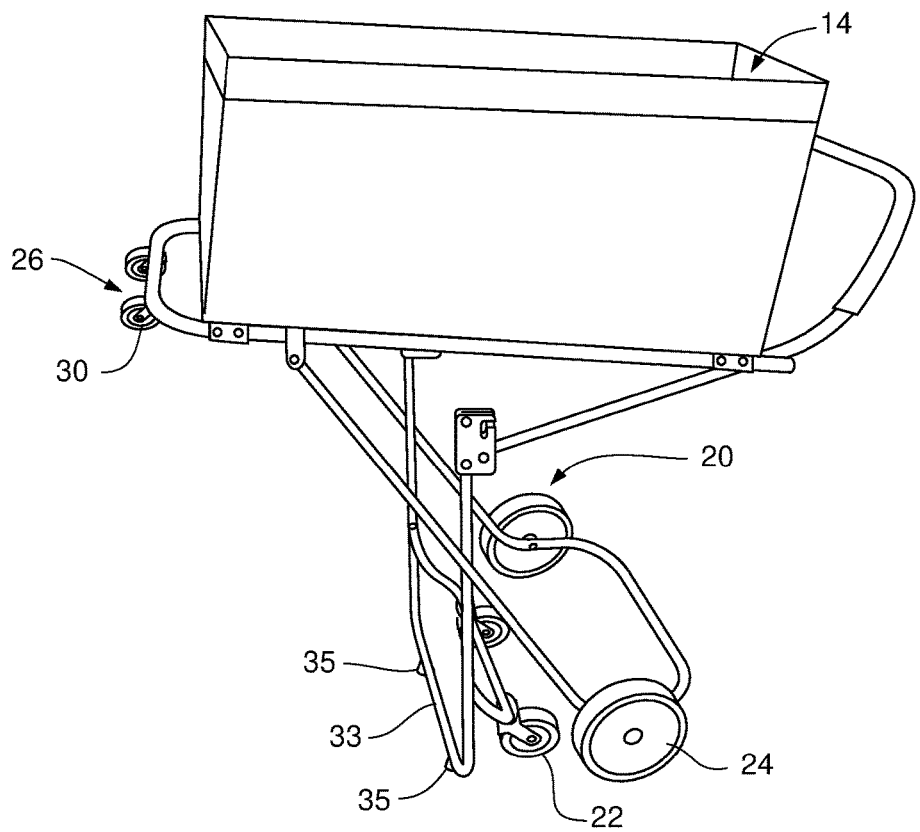
FIG. 4A is a pictorial representation of the embodiment of the shopping cart of FIG. 1A in a partially collapsed position ready for loading into a vehicle, via a rear platform of a vehicle, e.g., onto a floor of a back of a minivan.
Figure 5:
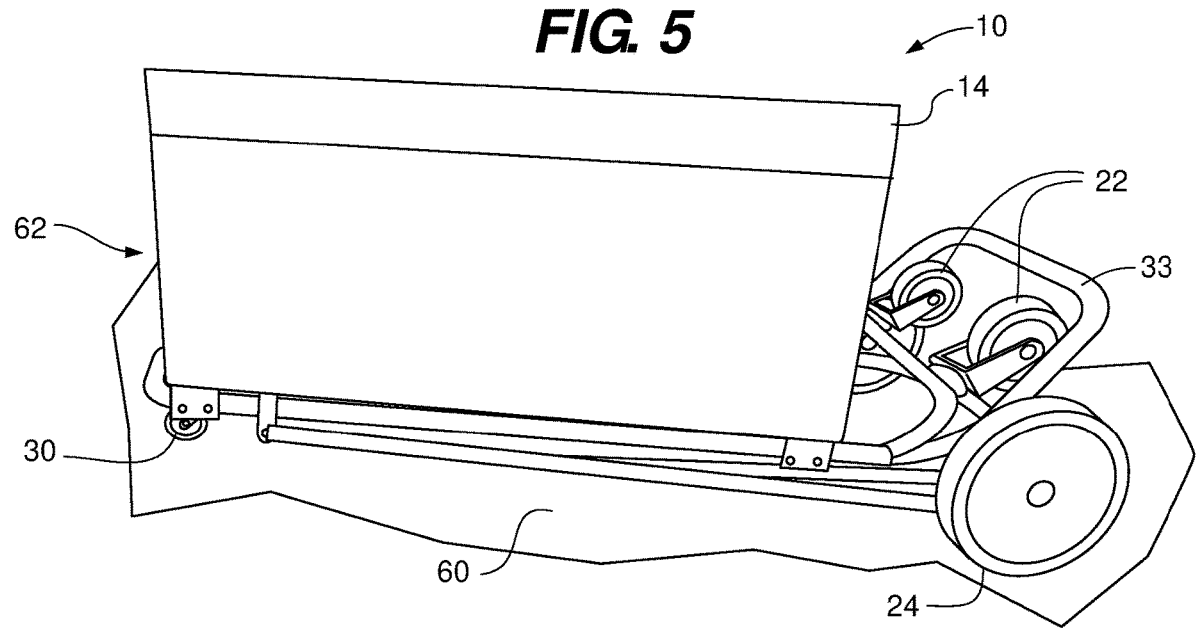
FIG. 5 is a pictorial representation of the shopping cart of FIG. 1A in a collapsed horizontal position, for example, as loaded into a back of a vehicle, such as a minivan or SUV.

As best shown in FIGS. 3A and 3B, each lockably hinged connector 44 cooperates with, and is coupled to, an upper bar 46 and a lower bar 48 which together form the foldable bar 36. In embodiments, the upper bar 46 includes a first pin 50, which in the locked position of FIG. 1A, 1B, is captured and locked within a first groove 52, e.g., an L-shaped groove 52 as shown on the lockably hinged connector 44. The upper bar 46, in embodiments, also includes a second pin 54 which remains slidably captured in a second groove 56 both in the locked position and during the transition (see FIGS. 3A, 4) from the locked position to a folded position (FIG. 5, for example).

Referring to FIGS. 3A and 3B, the first pin 50 and second pin 54 may be provided on both an inner and outer side of the upper bar 46, and the lockably hinged connector 44 also includes the first 52 groove and the second groove 56 located on both of the corresponding inner and outer sides to cooperate with both sets of the first 50 and second pin 54.

Figure 8A:
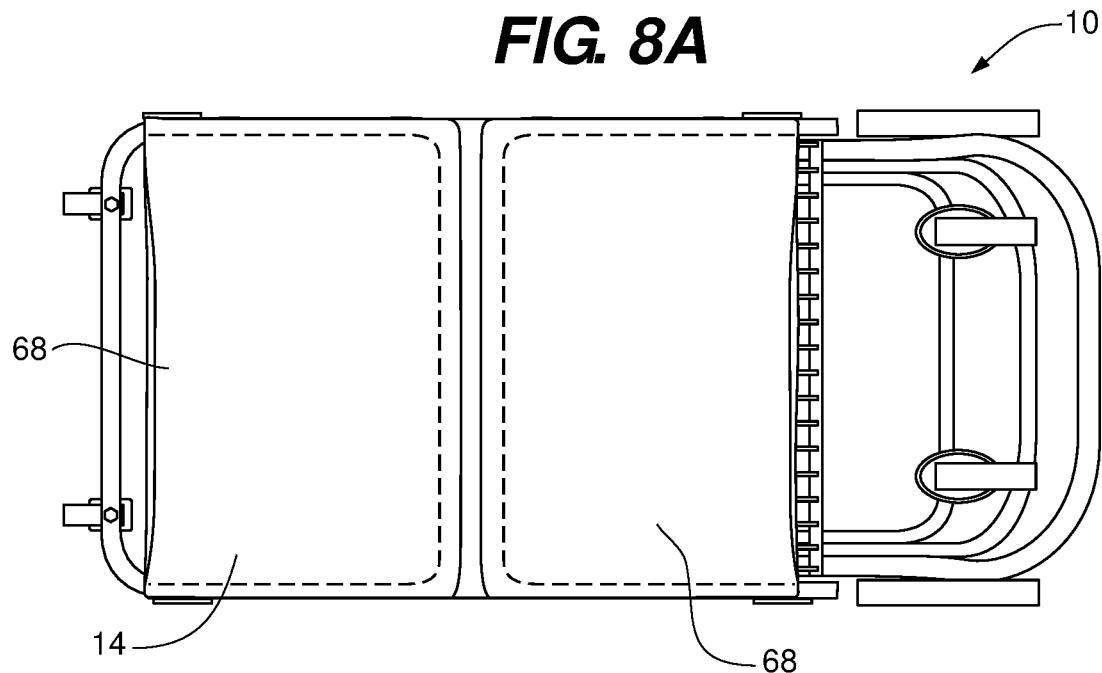
FIGS. 8A and 8B are pictorial representations of the shopping cart of FIG. 1A and FIG. 3A, respectively, in a fully collapsed, horizontal and flat position for storage.
Figure 8B:
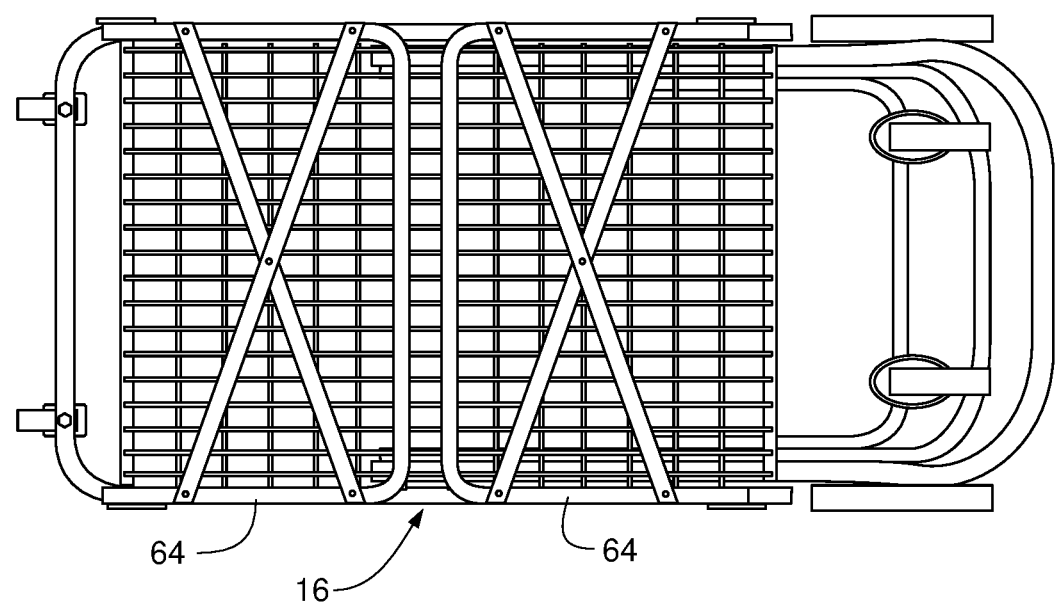

Referring to FIG. 3A, on each of the first side portion 40 and second side portion 41, the first pin 50 on the upper bar 46 can be slidably disengaged from the lockably hinged connector 44 to allow each upper bar 46 to be folded relative to, and in embodiments, to a position parallel to and beneath, the lower bar 48 to which it is hingedly joined, as shown in FIGS. 8A, 8B. Referring also to FIG. 2, in embodiments, the foot bar 58 is operatively connected to each of the rear wheels 24 as well as to each rigid bar 32. To fold the lower portion 20 of the frame 16 underneath the platform 18 to a folded position, as shown, for example, in FIG. 5, a user may anchor the shopping cart 10 along the lower portion 20 of the frame 16 to the horizontal surface by stepping on the foot bar 58 while pulling up on the handle bar 12 and thus on the upper bar 46 to disengage the first pin 50 on the upper bar 46 from the first groove 52 on the lockably hinged connector 44 as described above, thereby unlocking the lockably hinged connector 44 and allowing hinged rotation of the lower bar 48 relative to the upper bar 46.

The lockably hinged connector 44 on each of the first and second side portion 40, 41 is also preferably located above the coupling device 42, so that once the lockably hinged connector 44 is unlocked, the hinged rotation of the lower bar 48 around the upper bar 46 via the lockably hinged connector 44 likewise rotates the rigid bar 32 relative to the lower bar 48 that it is rotatably coupled thereto via the coupling device 42.

Figure 4B:
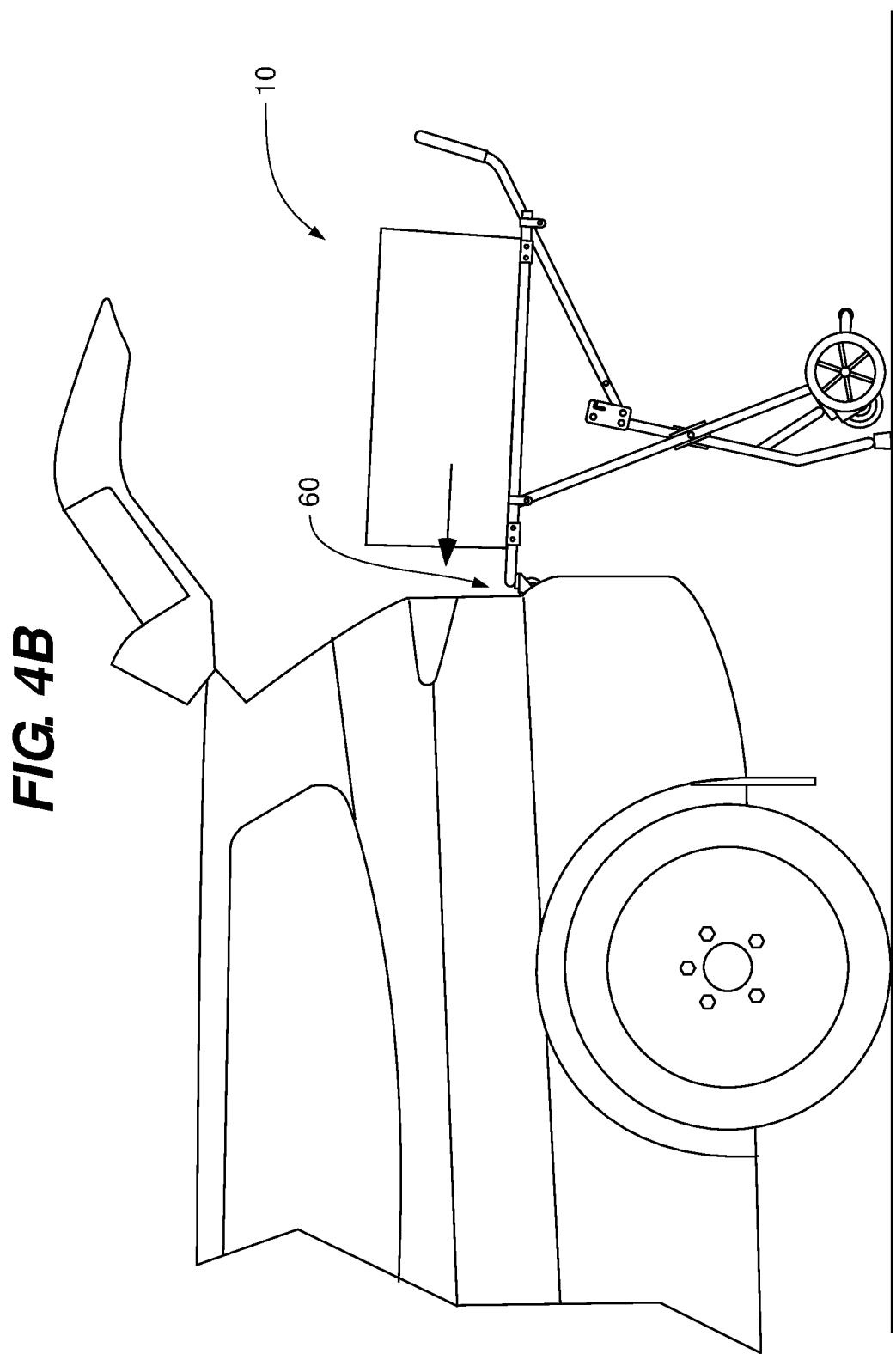
FIG. 4B is a pictorial representation of the embodiment of the shopping cart of FIG. 1B in a partially collapsed position ready for loading into a vehicle, via a rear platform of a vehicle, e.g., onto a floor of a back of a minivan.

The folded position of FIG. 5 represents the position in which the shopping cart 10 may be positioned into a back of a minivan, for example. Referring also to FIGS. 4A, 4B, after disengaging the first pin(s) 50 as shown in FIGS. 2 and 3A, a user may push the front end portion 26 of the platform 18 into a back of a minivan for example, with the upper wheels 30 positioned on the flat surface of the back/trunk of a minivan, SUV, or similar vehicle, for example. As a user pushes the shopping cart 10 into the vehicle, the lower portion 20 of the frame 16 will continue to fold as it is moved across the floor of the vehicle until it is in a collapsed, horizontal position 62 represented in FIG. 5, in which the shopping cart 10 is shown resting on a flat horizontal surface 60.

Referring to FIGS. 4A, 4B, to assist with stably positioning the shopping cart 10 into a trunk of a vehicle or onto any horizontal raised surface, in embodiments, the stabilizer bar 33, which connects the foldable bars 36, in particular, the lower bars 48, across the lower portion 20 of the frame 16, includes at least one stabilizer foot 35, and in embodiments, two stabilizer feet 35. In embodiments, the stabilizer feet 35 may also be configured to be leveled using a height-adjustable connector, such as a threaded rod, between each of the stabilizer feet 35 and the stabilizer bar 33.

The at least one stabilizer foot 35 may be formed of rubber, or other, non-slip materials.

Figure 1C:
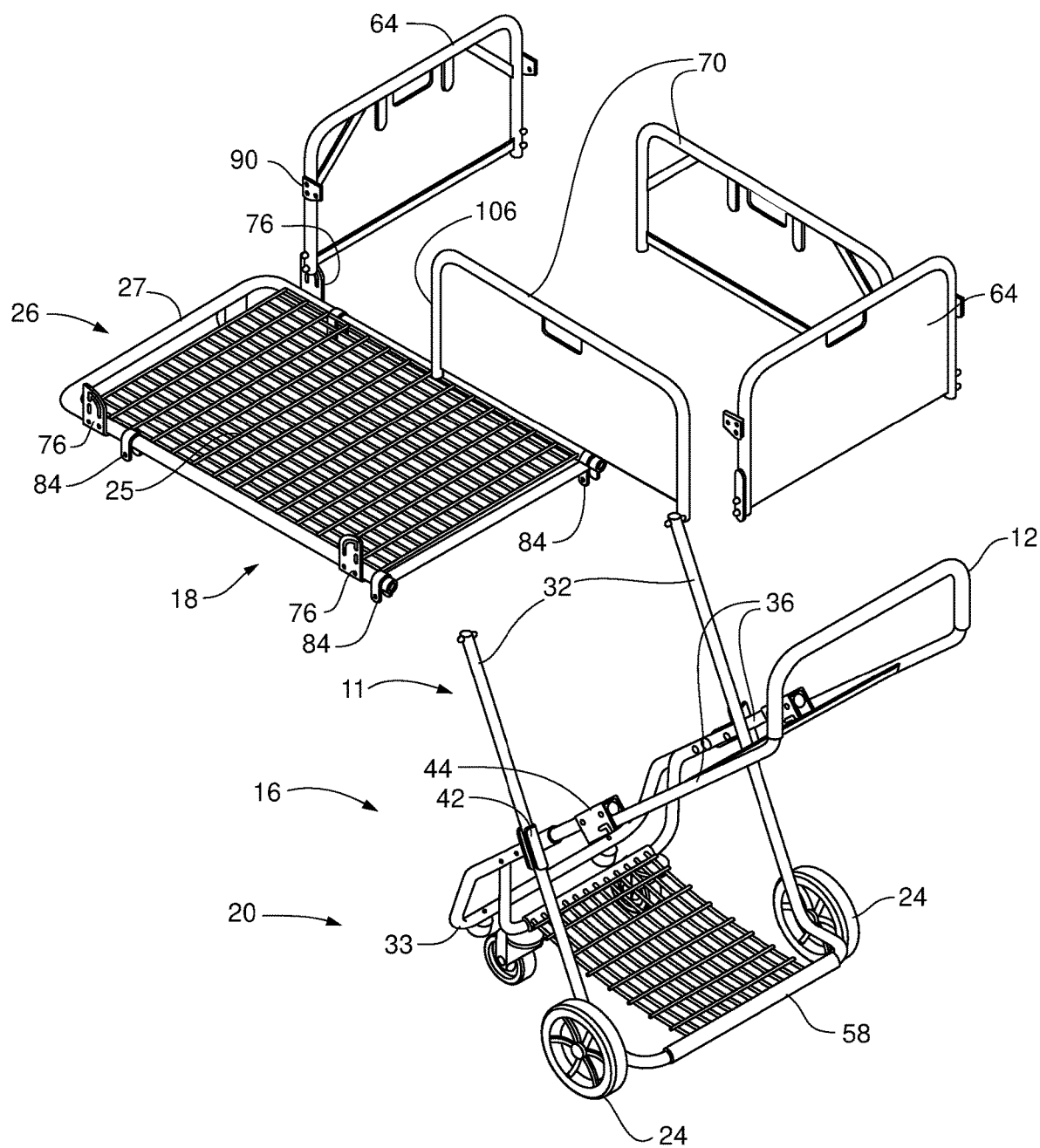
FIG. 1C is an exploded view of the shopping cart in FIG. 1B.
Figure 1D:
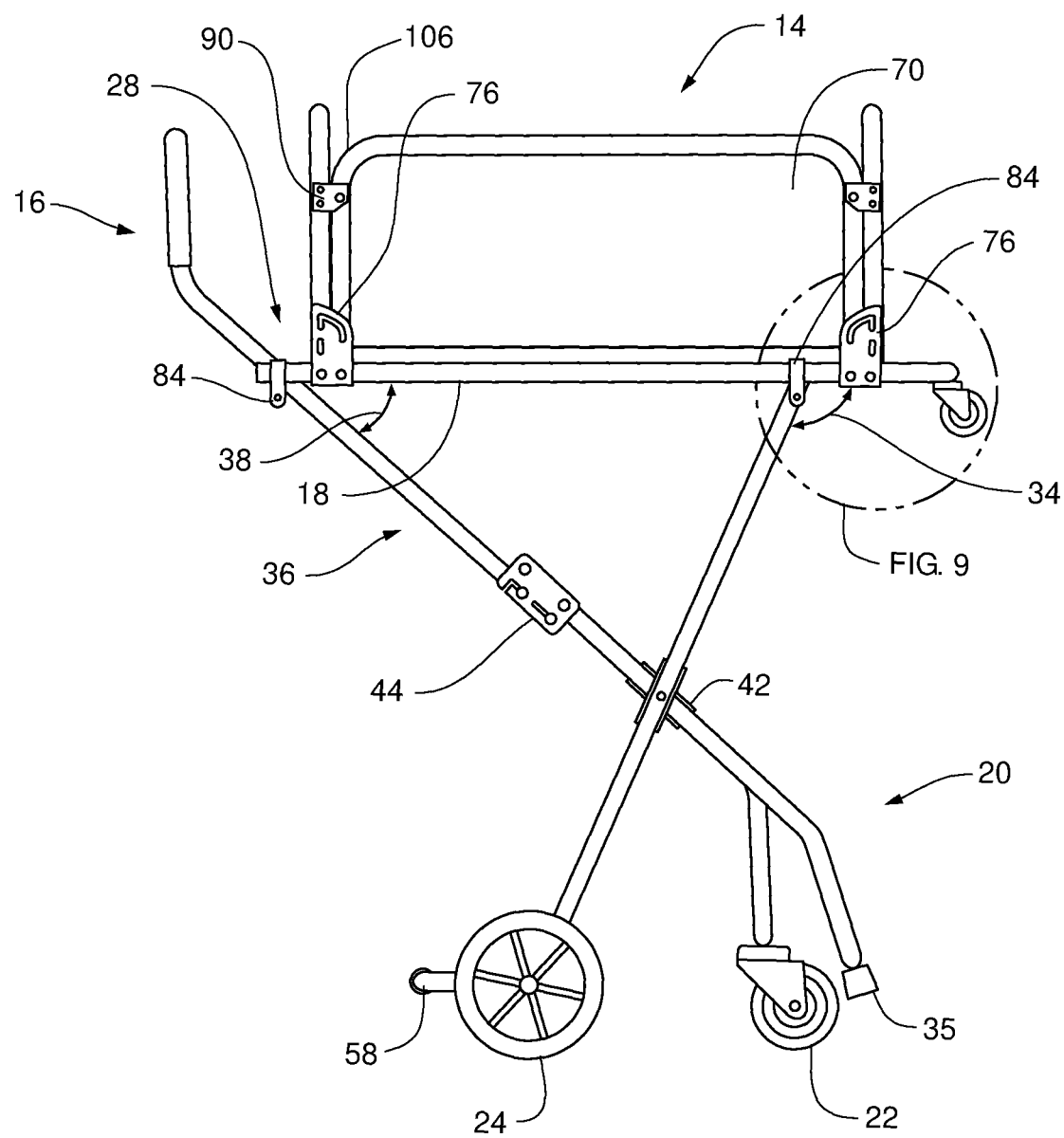
FIG. 1D is a side view of the shopping cart in FIG. 1B.

The at least one stabilizer foot 35 is/are positioned on the stabilizer bar 33 to be above and off the horizontal (ground or floor) surface when the car 10 is in use, as shown in FIGS. 1A, 1B and 1D, for example. Referring to FIG. 1D, in embodiments, the stabilizer bar 33 and the at least one stabilizer foot 35 positioned thereon are located forward of, and higher than (off the ground) the front wheels 22 when the shopping cart 10 is positioned for use.

Referring again to FIGS. 3A, 4A, and 4B, once released from its locked position, as described herein, the lockably hinged connector 44 is configured to provide 180 degree rotation of the lower bars 48 relative to the upper bar 46 allowing the lower bars 48 to be folded under and parallel to the upper bars 46.

In embodiments, when the lockably hinged connector 44 is released in the unlocked position to allow rotation, the lower bars 48 are configured to rotatably hinge rearward, i.e., in a direction of rotation that rotates the stabilizer bar 33 downward, so that the front wheels 22, which are rearwardly positioned relative to the stabilizer bar 33, are rotated rearwardly and upwardly, off the ground. In this way, contact with the horizontal, e.g., ground, surface shifts from the front wheels 22 to the stabilizer feet 35. As the lower bars 48 rotate to a vertical or near vertical position as shown in FIG. 4A and FIG. 4B, the rigid bars 32, which are pivotably connected via the coupling device 42 to the lower bars 48, are also rotated in the same rearward direction as the lower bars 28, so that the rear wheels 24 are likewise lifted rearwardly and off the ground, so that contact with the horizontal, e.g., ground, surface 60 shifts from both the front wheels 22 and the rear wheels 24 to the stabilizer feet 35 and the upper wheels 30.

In embodiments, as the shopping cart 10 is pushed forward from the vertical position shown in FIGS. 4A, 4B, the upper wheels 30 remain in contact with the horizontal surface 60 of a trunk of a minivan, vehicle, or other raised horizontal surface. The user may then pull up on the foot bar 58 to raise the rear wheels 24 and facilitate rotation of the rigid bars 32 and the lower bars 48 rearward, collapsing them upward against the platform 18 until the shopping cart 10 is in the collapsed position, and rolling the shopping cart 10 forward with the rear wheels 24 and the upper wheels 30 in contact with the horizontal surface of the vehicle, as shown in FIG. 5.

Figure 9:
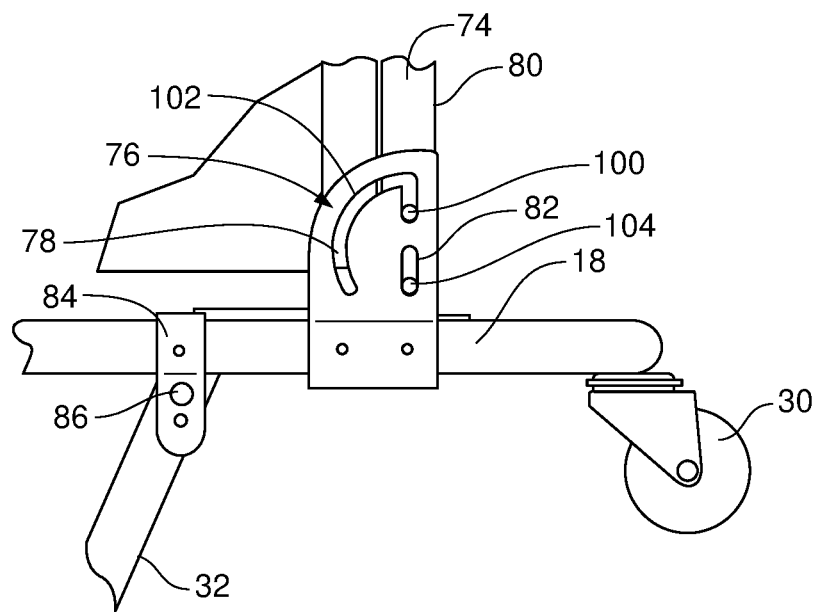
FIG. 9 is a magnified view of a platform hinge plate on the shopping cart of FIG. 1D.
Figure 11:
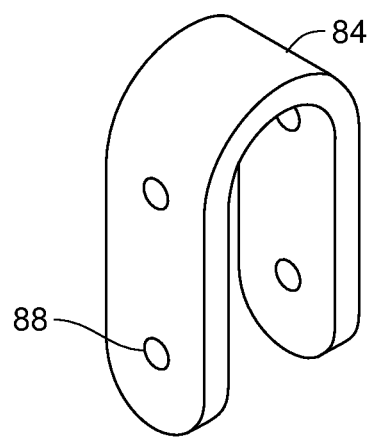
FIG. 11 is a pictorial representation of an embodiment of a frame connector for rotatably connecting a platform for supporting items collected in the shopping cart to an upper portion of a frame for transporting the platform.

The horizontal position 62 of the shopping cart 10 is further achieved via the rotatable connections, via dowel pins 86 (see FIG. 9), for example, of the rigid bars 32 and upper bars 46 to the platform 18 provided by the frame connectors (see also FIGS. 9, 11). For example, the frame connectors 84 located at the rear end portion 28 allow rotation of a hinged end (at the lockably hinged connector 44) of the upper bars 46, together with the hinged connector 44, upward toward the platform 18 until the upper bar 46 is substantially parallel to and adjacent the platform 18, with the lower bar 48 hingedly folded adjacently parallel to, and beneath the upper bar 46 via the rearward rotation of the lower bar 48 around the lockably hinged connector 44.

Similarly, the frame connectors 84 that rotatably connect the rigid bars 32 to the front end portion 26 of the platform 18, via dowel pins 86 (see FIG. 9), for example, allow rearward rotation of the rigid bars 48 until they are substantially parallel to the platform, as shown in FIGS. 8A and 8B.

As also shown in FIG. 5, in the collapsed, horizontal position 62, the front pair of wheels 22 are folded above the rear pair of wheels 24 and not contacting the horizontal surface, so that the shopping cart 10 may now roll horizontally into the back of a vehicle or on any horizontal surface via the upper wheels 30 and the rear wheels 24. As described herein, the basket portion 14 may be maintained in a horizontal position with its contents intact as it is collapsed from its in-use position 15 as the shopping cart 10 of FIG. 1A, 1B, to the collapsed, horizontal position 62.

Upon arriving at home or other destination, the shopper can remove the personal shopping cart 10 from one's vehicle, by un-collapsing it and locking it in the in-use position shown in FIG. 1A or FIG. 1B without having to remove the purchased items from the basket portion 14. In particular, the shopper rolls the shopping cart 10 rearward out of the vehicle, with the front 22 and rear wheels 24 initially in contact still with the horizontal surface. Once the rear wheels 24 clear the vehicle they begin to drop and the user may pull down on the foot bar 58 to assist the rear wheels 24 to contact the ground. The user may then anchor the shopping cart to the horizontal surface by stepping down on the foot bar 58 while pushing the handle bar 12 forward, together with the upper bar 46 connected thereto, until the pin 50 on the upper bar 46 is captured and locked into position via the lockably hinged connectors 44 to align and lock the upper 46 and lower bar 48 into the in-use position. In doing so, the front wheels 22 and the rear wheels 24 are likewise rotated to the in-use position. The shopper may then push the shopping cart 10 to its destination, e.g., into one's home. Once groceries are removed from the shopping cart 10, it may then be positioned again into the flat, horizontal position of FIGS. 8A and 8B for storing under a bed, for example. In particular, instead of pushing the shopping cart 10 into the back of a vehicle, the user may push the shopping cart 10 forward from the vertical position shown in FIG. 4A, 4B so that the shopping cart 10 collapses slowly onto the ground.

Figure 6:
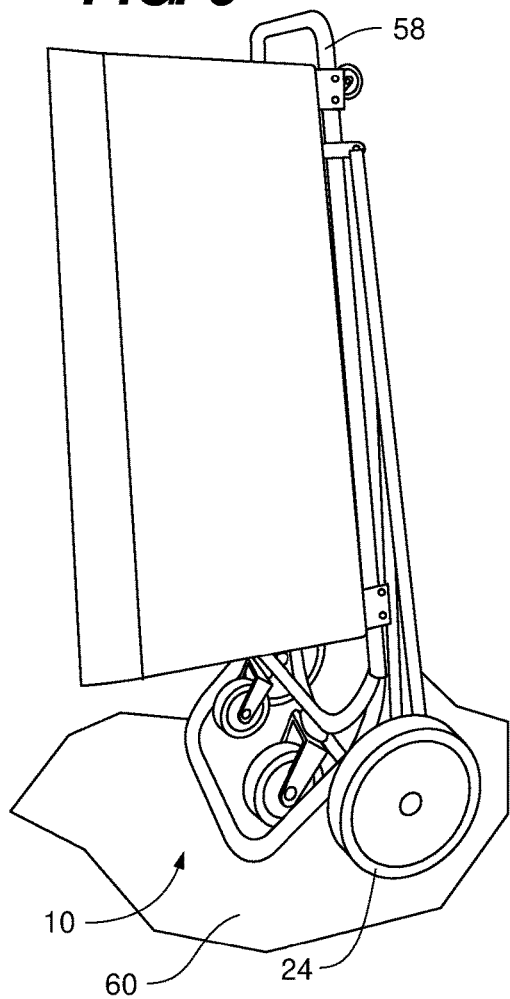
FIG. 6 is a pictorial representation of the shopping cart of FIG. 1A in a vertical collapsed position.
Figure 7:
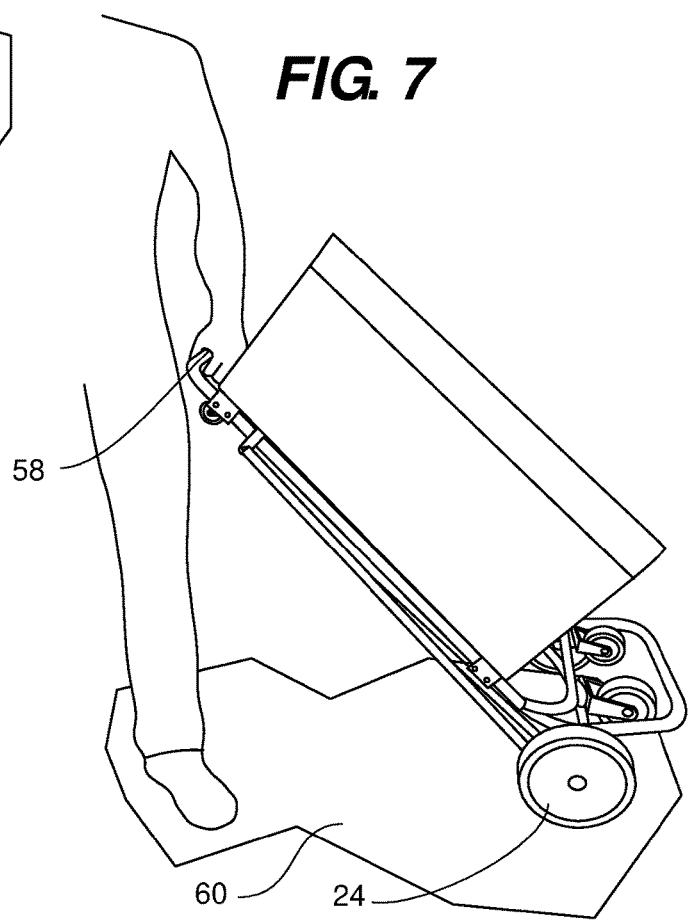
FIG. 7 is a pictorial representation of the shopping cart of FIG. 6 in a vertically rollable position.

Referring also to FIGS. 6 and 7, once the shopping cart 10 is collapsed into the horizontal position 62 of FIG. 5, the foot bar 58 may be used as a handle to place the shopping cart 10 into an upright vertical position as shown in FIG. 6, and to transport it via the rear pair of wheels 24. The shopping cart 10 may be stored in a closet in this upright vertical position, with the basket portion 14 also collapsed via foldable extensions 64 as described herein, and rolled into a closet for easy storage.

Referring for example to FIGS. 1A-1D and FIG. 3A, as well as to FIGS. 8A and 8B, the frame 16 of the shopping cart 10 preferably includes at least two foldable extensions 64 extending upward from, and lockably hinged to, the platform 18. The at least two foldable extensions 64, in embodiments, form a front side 65 and rear side 67 of the basket portion 14 as shown in FIG. 3A. In embodiments, the basket portion 14 may include sleeves 68 (see FIG. 8A shown). When the foldable extensions 64 are locked into an upright position extending vertically upward from the platform 18 as shown in FIG. 3A, for example, a removable basket 66 (see FIG. 1A) may be positioned over the foldable extensions 64 via the sleeves 68 or pockets sewn into at least the portions of the removable basket 66 corresponding to the front 65 and rear side 67 of the basket portion 14 to hold the removable basket 66 open in use for collecting items therein. Accordingly, the removable basket 66 may, in embodiments, be configured to be removable for washing, and/or as a grocery bag in itself for transporting the contents therein away from the shopping cart 10.

The removable basket 66 may be formed of a fabric material and may include handles for carrying, with the collected contents intact, once it is removed from the basket portion 14.

The foldable extensions 64, in embodiments, are preferably foldable inward and flat atop the platform 18, as shown in FIGS. 8A and 8B, with or without a removable basket 66 attached, to facilitate storage of the shopping cart 10 in a collapsed position, whether horizontally for positioning under a bed, for example, as shown in FIGS. 8A and 8B, or to further collapse the shopping cart 10 from the vertical position shown in FIG. 6 to save space when storing in a vertical position.

The user may use the shopping cart 10 to place separate plastic or environmentally friendly bags therein, or may place their items directly into the basket portion 14, with or without the removable basket 66 installed onto the shopping cart 10.

Referring to FIG. 1B, in embodiments, the shopping cart 10 may further include an additional two foldable extensions 70 forming a first (right) side 71 and a second (left) side 73 of the basket portion 14, which may be locked into an upright position extending vertically upward from the platform 18. Like the two foldable extensions 64 forming the front and rear of the basket portion 14, the two foldable extensions 70 are also lockably hinged to the platform 18, and configured when unlocked to fold inward and flat atop the platform 18 for storage.

Each of the foldable extensions 64, 70, in embodiments, includes a metal frame, for example, a substantially u-shaped metal frame, with its legs 74 extending upward from each corner of the platform 18 when locked in position for use. In embodiments, metal straps 72 (FIG. 3A) or meshing can be connected across the legs 74 of the metal frame.

In other embodiments, as shown in FIG. 1B, for example, the foldable extensions 64, 70 may include a sheet of material connected between the legs 74 of the metal frame.

In embodiments, the sheet of material of the foldable extensions 64, 70 may be at least partially transparent.

In embodiments, the sheet of material may be formed of plexiglass.

In still additional embodiments, the sheet of material is suitable for printing graphics on the outer surface, such as a logo or advertisement.

In embodiments, referring to FIG. 1B, for example, the foldable extensions 64 forming the front side 65 and rear side 67 of the basket portion 14 are higher than the foldable extensions 70 forming the first (right) side 71 and the second (left) side 73 of the basket portion 14.

Figure 10:
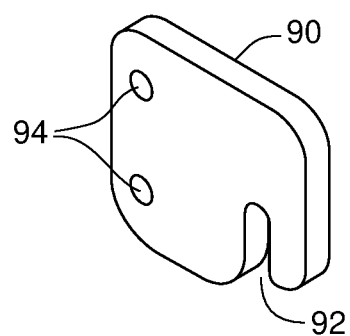
FIG. 10 is a pictorial representation of an embodiment of locking bracket.

Referring to FIGS. 9 and 10, together with FIGS. 1B, 1C, and 1D, as well as 3A, the platform 18, in embodiments, may include a hinge plate 76 extending upward from, and positioned at each corner of, the platform 18. The hinge plates 76 are assembled onto, and parallel to, the sides of the platform 18. Each of the (front and rear) foldable extensions 64 is rotatably connected to the platform 18, for folding inward and downward onto the platform 18, along the front end portion 26 and rear end portion 28, respectively, via hinge plates 76 located along opposing first 40 and second side portions 41 of the shopping cart 10.

Referring to FIG. 9, in embodiments, each leg 74 of each of the front and rear foldable extensions 64 includes a locking pin 100 extending outward from the side portions 40, 41 of the shopping cart 10. The locking pin 100 on each leg 74 is captured and locked within a groove 102 when the corresponding foldable extension 64 is in the locked, vertical position to form the basket portion 14.

In embodiments, the groove 102 includes a straight portion 80 vertically disposed along the leg 74, an upper end meeting a curved slot 78 that curves inward and downward toward the platform 18 from the upper end of the straight portion 80.

In embodiments, the locking pin 100 is seated at the bottom of a straight portion 80 in the groove 102 of the hinge plate 76 in the locked, vertical position.

Each leg 74 may also include a captured pin 104 extending outward from the side portions 40, 41, which is vertically disposed below the locking pin 100. The captured pin 104 remains slidably and rotatably captured within a straight slot 82 located on the hinge plate 76 in both the locked position and folded, collapsed position of the foldable extensions 64. The straight slot 82 is vertically disposed below the straight portion 80 of the groove 102 on the hinge plate 76.

In the embodiment of FIG. 9, for example, when a user pulls up and then inward on one of the foldable extensions 64, the locking pin 100 along each side portion 40, 41, travels upward within the straight portion 80 of the groove 102 and into the curved slot 78 to rotatably travel within the curved slot 78, thus allowing the foldable extension 64 to be folded inward and down onto the platform 18.

Referring to FIGS. 10 and FIGS. 1B-1D, in embodiments, a locking bracket 90 is also mounted onto each leg 74 of each of the front and rear foldable extensions 64, and is preferably disposed vertically above the locking pin 100 and captured pin 104, and along, and parallel to, the sides 40, 41, of the shopping cart 10. Referring to FIG. 10, the locking bracket 90 includes a slot 92 disposed with the opening facing downward toward the ground. As shown in FIG. 1D, locking bracket 90 may include apertures 94 (see FIG. 10), which can facilitate mounting the locking bracket 90 via conventional hardware (not shown) to an upwardly extending leg 74 (see FIG. 3A) of one of the foldable extensions 64.

Each leg 74 of each of the two foldable (side) extensions 70 also includes a pin 106 extending outward from the side portions 40, 41 of the shopping cart 10, and located at a sufficient height to slide and lock into the slot 92 when the foldable (side) extensions 70 are locked into an upright position.

When a user pulls up on one of the (front and rear) foldable extensions 64 to rotatably collapse the foldable extension 64, the foldable extension 64 also disengages from each of the side foldable extensions 70. In the embodiment shown, the upward movement of one of the foldable extensions 64 dislodges each of the pins 106 that was slidably connecting the foldable extension 64 to each of the foldable side extensions 70. Accordingly, upward and inward rotation of each of the foldable extensions 64 to fold them onto the platform 18 likewise releases the side extensions 70 to collapse inward and onto the platform 18.

Referring to FIG. 1B, 1C, in additional embodiments, the shopping cart 10 may also include an additional lower platform 108 for collecting items, which may extend across the lower portion 20 of the frame 16, for example, between the foot bar 58 and the front bar 59. In embodiments, the lower platform 108 is a flexible mesh material.

Additional advantages of embodiments of the personal shopping cart of the disclosure include reducing single use grocery bags and merchant plastic shopping bags, and limiting the spread of germs that occur through contact by multiple people placing their hands on the handle bar 12 of grocer-supplied shopping carts. The shopping cart of the present disclosure is not limited to use for groceries, but may also be used to carry sporting equipment, party supplies, and mall shopping items such as clothing and other items. It may also function as a dolly or hand truck when used in the upright, vertical position, having the rear wheels 24 positioned for rolling while in the vertical position.

The personal shopping cart 10 described herein can be fashioned from a lightweight material and provides a sanitary, convenient, and ecofriendly way to shop.

While particular embodiments of the present disclosure have been particularly shown and described with reference to specific embodiments, it should be apparent to those skilled in the art that the foregoing is illustrative only and not limiting, having been presented by way of example only. It is to be understood that the disclosed embodiments are merely examples of the disclosure, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A shopping cart, comprising:
a basket portion for collecting items;
a platform configured to support the items collected in the basket portion, the platform including a front end portion and a rear end portion; and
a frame operatively attached to the platform and configured to support and transport the basket portion, wherein the frame is configured to position the shopping cart in an in-use position for shopping and in a collapsed position;
two front wheels vertically disposed beneath the front end portion of the platform in the in-use position, each of the two front wheels positioned opposite one another along a first side portion and a second side portion of the shopping cart respectively, and two rear wheels vertically disposed beneath the rear end portion of the platform in the in-use position, each of the two rear wheels positioned opposite one another along the first side portion and the second side portion of the shopping cart respectively, the two front wheels and the two rear wheels being operatively attached to a lower portion of the frame and configured to cooperatively contact a horizontal surface for transporting the shopping cart in the in-use position;
two foldable bars, each of the two foldable bars positioned opposite one another along the first side portion and the second side portion respectively, each of the two foldable bars including an upper bar and a lower bar and a lockably hinged connector hingedly connecting the upper bar to the lower bar, the upper bar including a pin slidably engaged with the lockably hinged connector in the in-use position, wherein the upper bar and the lower bar are locked in alignment in a locked position via the lockably hinged connector to form a straight rigid bar in the in-use position; and
wherein the lower bars along each of the first side portion and the second side portion are operably connected across the lower portion of the frame via a stabilizer bar, wherein the stabilizer bar is operably connected to and positioned forward of the two front wheels in the in-use position, the two front wheels being hingedly rotatable rearward and beneath the rear end portion, the two front wheels being positioned beneath the rear end portion, above the two rear wheels, and off of the horizontal surface in the collapsed position.

2. The shopping cart of claim 1, wherein each of the upper bars is rotatably connected to the platform along the rear end portion via a rear frame connector, each of the foldable bars in the locked position extending downwardly from the platform and forwardly along each of the first side portion and the second side portion of the shopping cart, each of the upper bars being rotatable upwardly and parallel to the platform via the rear frame connector, and each of the lower bars being hingedly rotatable rearward relative to each of the upper bars via the lockably hinged connector in the unlocked position beneath and parallel to the upper bars in the collapsed position.

3. The shopping cart of claim 1, further comprising two upper wheels connected to the front end portion of the platform.

4. The shopping cart of claim 3, wherein the shopping cart is horizontally transportable via the two upper wheels and the two rear wheels in the collapsed position.

5. A shopping cart, comprising:
a basket portion for collecting items;
a platform configured to support the items collected in the basket portion, the platform including a front end portion and a rear end portion; and
a frame operatively attached to the platform and configured to support and transport the basket portion, wherein the frame is configured to position the shopping cart in an in-use position for shopping and in a collapsed position;
two front wheels vertically disposed beneath the front end portion of the platform in the in-use position, each of the two front wheels positioned opposite one another along a first side portion and a second side portion of the shopping cart respectively, and two rear wheels vertically disposed beneath the rear end portion of the platform in the in-use position, each of the two rear wheels positioned opposite one another along the first side portion and the second side portion of the shopping cart respectively, the two front wheels and the two rear wheels being operatively attached to a lower portion of the frame and configured to cooperatively contact a horizontal surface for transporting the shopping cart in the in-use position;
two foldable bars, each of the two foldable bars positioned opposite one another along the first side portion and the second side portion respectively, each of the two foldable bars including an upper bar and a lower bar and a lockably hinged connector hingedly connecting the upper bar to the lower bar, the upper bar including a pin slidably engaged with the lockably hinged connector in the in-use position, wherein the upper bar and the lower bar are locked in alignment in a locked position via the lockably hinged connector to form a straight rigid bar in the in-use position, and wherein the lower bar of each of the two foldable bars is operatively connected to one of the two front wheels; and
two rigid bars, wherein each of the two rigid bars is positioned opposite one another along the first side portion and the second side portion respectively, each of the two rigid bars being rotatably connected to the platform along the front end portion via a front frame connector, one of the two rigid bars in the in-use position extending downwardly from the platform and rearwardly along the first side portion and adjacently crossing one of the two foldable bars positioned along the first side portion, and one of the two rigid bars in the in-use position extending downwardly from the platform and rearwardly along the second side portion and adjacently crossing one of the two foldable bars positioned along the second side portion of the shopping cart, wherein the two rigid bars are operatively connected to the two rear wheels,
wherein the foldable bar and the rigid bar adjacently crossing each other along each of the first side portion and the second side portion are pivotably coupled via a coupling device, and wherein the two front wheels are hingedly rotatable via the coupling device rearwardly to the collapsed position beneath the rear end portion.

6. The shopping cart of claim 5, further comprising a handle bar connectedly extending upwardly from each of the upper bars, the handle bar connecting the upper bar on the first side portion to the upper bar on the second side portion proximate the rear end portion of the platform, wherein the handle bar is configured to be upwardly operable by a user to slidably disengage the pin from the lockably hinged connector on each of the first side portion and the second side.

7. The shopping cart of claim 5, wherein the lockably hinged connector is located above the coupling device along each of the first side portion and the second side portion.

8. The shopping cart of claim 5, wherein each of the two rigid bars is pivotable relative to the lower bar via the coupling device in the unlocked position and rearwardly rotatable via the front frame connector relative to the platform, the two rigid bars being positioned parallel to and beneath the platform in the collapsed position with the two rear wheels in contact with the horizontal surface.

9. The shopping cart of claim 6, wherein the two rigid bars along each of the first side portion and the second side portion are operably connected across the lower portion of the frame via a foot bar, wherein the foot bar is operably connected to the two rear wheels.

10. The shopping cart of claim 9, wherein the foot bar is configured for anchoring the frame to the horizontal surface by a user to facilitate operation of the handle bar to lock and unlock the lockably hinged connector.

11. The shopping cart of claim 1, wherein the stabilizer bar includes stabilizer feet, the lower bars being configured to rotate from the in-use position to a vertical position with the stabilizer feet contacting the horizontal surface, the two front wheels and the two rear wheels being position off the horizontal surface in the vertical position.

12. A shopping cart, comprising:
a basket portion for collecting items;
a platform configured to support the items collected in the basket portion, the platform including a front end portion and a rear end portion; and
a frame operatively attached to the platform and configured to support and transport the basket portion, wherein the frame is configured to position the shopping cart in an in-use position for shopping and in a collapsed position;
two front wheels vertically disposed beneath the front end portion of the platform in the in-use position, each of the two front wheels positioned opposite one another along a first side portion and a second side portion of the shopping cart respectively, and two rear wheels vertically disposed beneath the rear end portion of the platform in the in-use position, each of the two rear wheels positioned opposite one another along the first side portion and the second side portion of the shopping cart respectively, the two front wheels and the two rear wheels being operatively attached to a lower portion of the frame and configured to cooperatively contact a horizontal surface for transporting the shopping cart in the in-use position;
two foldable bars, each of the two foldable bars positioned opposite one another along the first side portion and the second side portion respectively, each of the two foldable bars including an upper bar and a lower bar and a lockably hinged connector hingedly connecting the upper bar to the lower bar, the upper bar including a pin slidably engaged with the lockably hinged connector in the in-use position, wherein the upper bar and the lower bar are locked in alignment in a locked position via the lockably hinged connector to form a straight rigid bar in the in-use position; and
at least two foldable extensions hingedly extending vertically upward from the platform to form two sides of the basket portion in the in-use position, each of the at least two foldable extensions being lockably and hingedly connected to the platform, the at least two foldable extensions configured to fold inward atop the platform in the collapsed position, and to lock in a vertical position in the in-use position, and wherein each of the at least two foldable extensions includes a frame that includes two legs extending upward from the platform in the in-use position, wherein each of the at least two foldable extensions further includes a sheet of material connected between the legs, and wherein the material is plexiglass.

13. The shopping cart of claim 1, further including at least two foldable extensions hingedly extending vertically upward from the platform to form two sides of the basket portion in the in-use position, each of the at least two foldable extensions being lockably and hingedly connected to the platform, the at least two foldable extensions configured to fold inward atop the platform in the collapsed position, and to lock in a vertical position in the in-use position, wherein each of the at least two foldable extensions includes a metal frame that includes two legs extending upward from the platform in the in-use position.

14. The shopping cart of claim 13, wherein each of the at least two foldable extensions further includes a sheet of material connected between the legs.

15. The shopping cart of claim 14, wherein the material is plexiglass.

16. The shopping cart of claim 13, wherein the at least two foldable extensions include a front foldable extension, a rear foldable extension, a left side extension, and a right side extension forming a front side, rear side, left side, and right side, respectively, of the basket portion in the in-use position, and wherein each of the front foldable extension and the rear foldable extension is hingedly connected via two hinge plates fixedly extending upward from the platform along each of the front end portion and the rear end portion of the platform, respectively, the two hinge plates extending along each of the first side portion and the second side portion of the shopping cart.

17. The shopping cart of claim 16, wherein each of the two legs of the front foldable extension and the rear foldable extension includes a locking pin extending outwardly from each of the first side portion and the second side portion of the shopping cart, wherein the locking pin is slidably captured and locked within a groove in each of the two hinge plates in the in-use position thereby locking each of the front foldable extension and the rear foldable extension in an upright vertical position.

18. The shopping cart of claim 17, wherein the groove includes a curved slot that curves downward toward the platform, and is configured to allow the locking pin to engage and rotate within the groove for inward hinged rotation of the front foldable extension and the rear foldable extension in the collapsed position flat against the platform, and wherein the groove further includes a straight portion vertically disposed along the leg, an upper end intersecting the curved slot, wherein the locking pin is captured in the curved slot in the in-use position, each of the front foldable extension and the rear foldable extension being configured for release from the upright vertical position by a user pulling upwardly to engage and rotate the locking pin in the curved slot.

19. The shopping cart of claim 17, and wherein each of the two legs of the left foldable extension and the right foldable extension includes a pin extending outwardly from each of the first side portion and the second side portion of the shopping cart, the shopping cart further including a locking bracket mounted onto each leg of each of the front and rear foldable extensions, the locking bracket disposed vertically above the locking pin and including a slot disposed with a downward-facing opening, wherein the pin is seated within the slot in the in-use position and is configured to dislodge from the slot in cooperation with the release of the front foldable extension and the rear foldable extension from the upright vertical position to allow inward rotation of the left foldable extension and the right foldable extension to the collapsed position flat against the platform.

20. The shopping cart of claim 13, further comprising a fabric basket removably attachable to each of the at least two foldable extensions for collecting the items placed in the basket portion.

\* \* \* \* \*